Oct. 7, 1952  G. MAXON, JR  2,613,106
DUMP BODY CONSTRUCTION
Filed Jan. 25, 1947  2 SHEETS—SHEET 1

THICKNESSES EXAGGERATED

Inventor
Glenway Maxon, Jr

Oct. 7, 1952  G. MAXON, JR  2,613,106
DUMP BODY CONSTRUCTION
Filed Jan. 25, 1947  2 SHEETS—SHEET 2
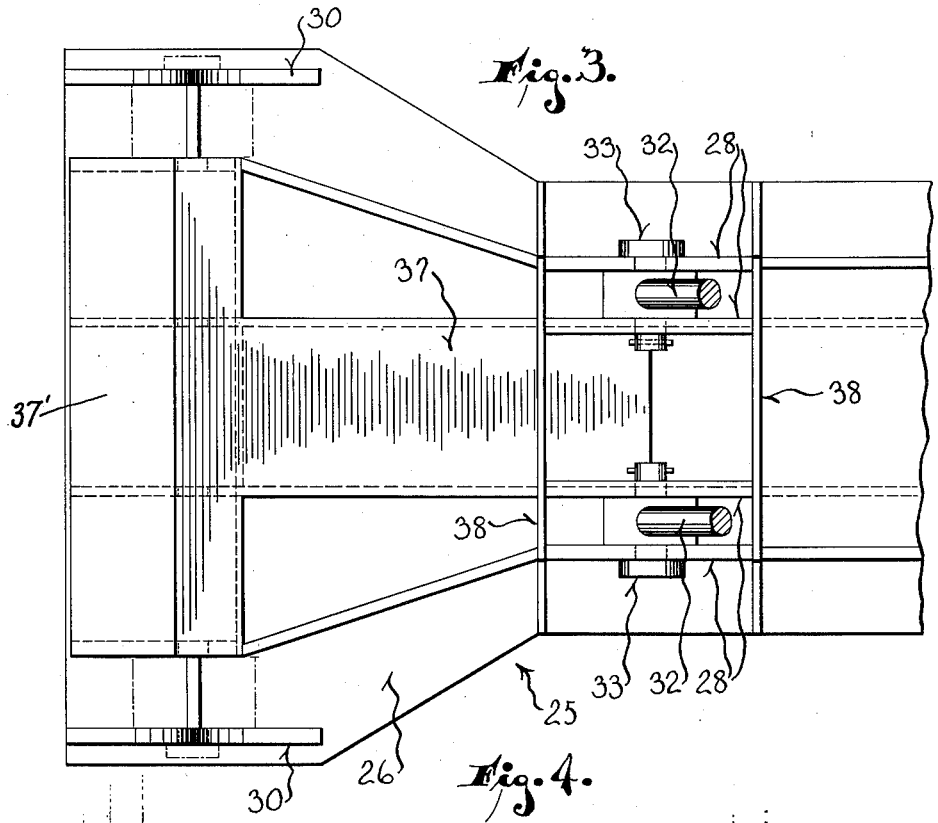
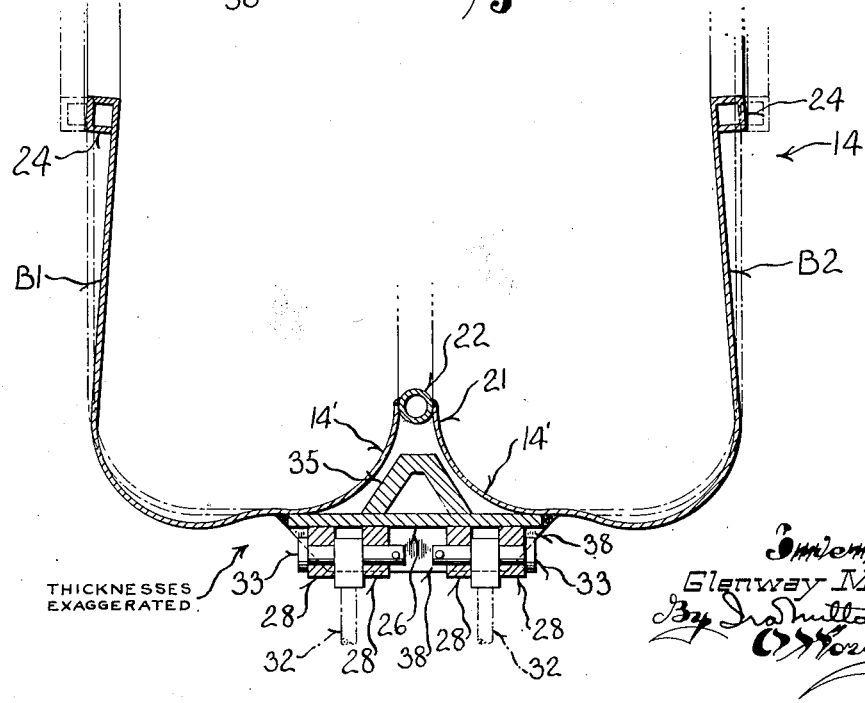
Inventor
Glenway Maxon, Jr.

Patented Oct. 7, 1952

2,613,106

UNITED STATES PATENT OFFICE 2,613,106

DUMP BODY CONSTRUCTION

Glenway Maxon, Jr., Milwaukee, Wis.

Application January 25, 1947, Serial No. 724,261

7 Claims. (Cl. 298—17)

This invention relates to dump trucks and refers more particularly to dump trucks of the type having lightweight shell-like bodies like that forming the subject matter of the copending application of Glenway Maxon, Jr., Serial No. 573,857, filed January 22, 1945, and entitled Dump Truck, which matured into Patent No. 2,465,899.

Heretofore bodies for dump trucks have been made excessively heavy by reason of the provision of a network of longitudinal sills or carrying members connected by transverse girders which were used to reinforce the bodies and render the entire body rigid. In some instances the reinforcing means was even applied to the interior of the body to protect the shell thereof against damage by rocks and the like dropped into the body from an elevation.

In the copending application hereinabove referred to the truck body is designed primarily for light weight and employs a single stress receiving keel running longitudinally of the body in its interior.

The dump truck of the instant invention also has the provision of a lightweight body such as described as one of its objects, but has the further purpose of providing for cushioning of the body during tilting of the same to afford protection for the body against shock which might result in damage to the thin metal of the body shell.

It is a more specific object of this invention to provide a lightweight dump truck body of the character described which is of resilient construction enabling yielding flexure of the body during the application of tilting force thereto but wherein excessive accumulation of stresses at the zone at which lifting force is applied to the body are avoided.

Another object of this invention is to provide a lightweight dump truck body of the character described wherein load reactions on the bottom wall of the body resulting from the application of tilting force thereto are distributed throughout a substantial area of the bottom wall of the body without the addition of any appreciable weight to the body and without interfering with yielding flexure of the body while in a tilted position or during the application of tilting force thereto.

With the above and other objects in view, which will appear as the description proceeds, this invention resides in the novel construction, and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which.

Figure 1:
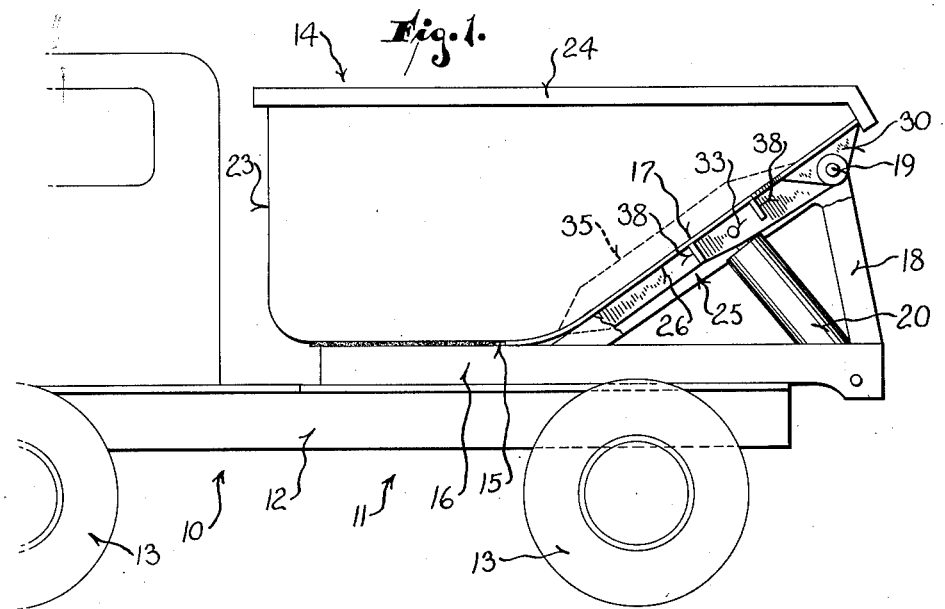
Figure 1 is a side elevational view of a portion of a dump truck having a body made in accordance with this invention and having parts thereof broken away to show its interior construction.
Figure 2:
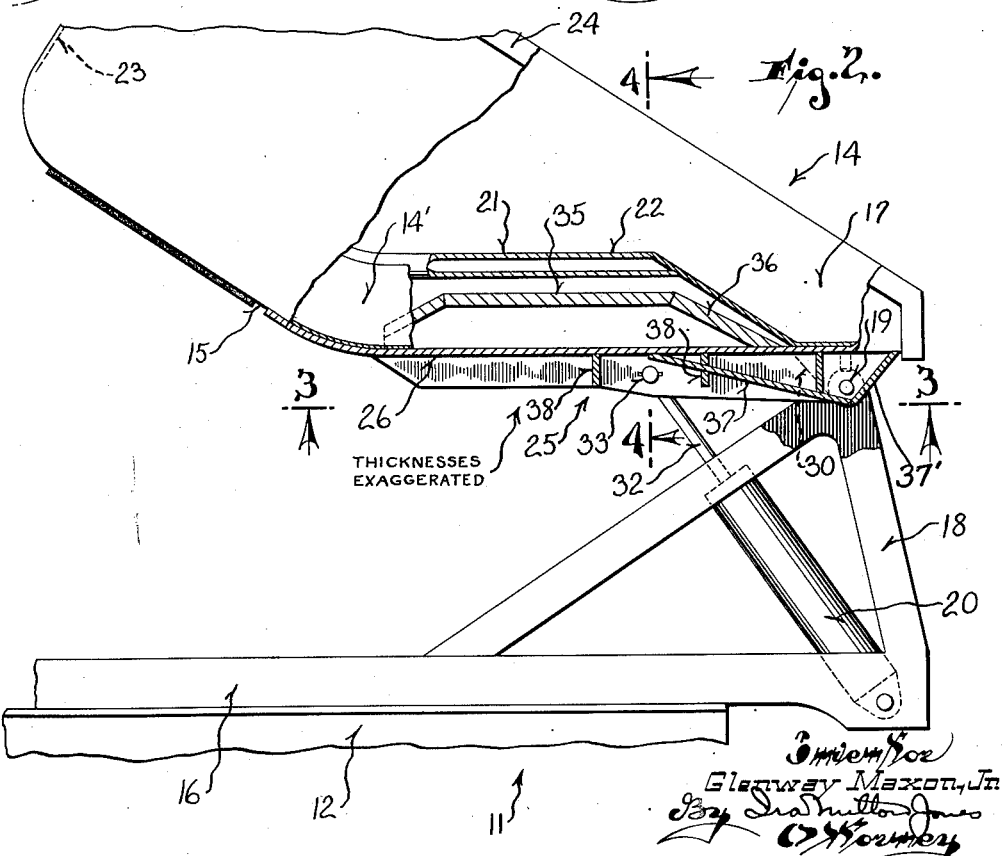
Figure 2 is an enlarged elevational view of the body showing the same in a partially elevated position and likewise having parts thereof broken away to better illustrate the reinforcing means for the bottom wall of the body.

Figure 3 is a view taken along the line 3—3 of Figure 2 looking at the underside of the bottom wall of the body from the side opposite that seen in Figure 2; and Figure 4 is a cross-sectional view taken along the plane of the line 4—4 of Figure 2 more or less diagrammatically illustrating the manner in which flexure of the body takes place during the application of lifting force thereto necessary for tilting the body to a load discharging position.

Referring now more particularly to the accompanying drawings in which like numerals indicate like parts the numeral 10 generally designates a dump truck only the rear body portion of which is illustrated.

The truck includes a chassis generally indicated at 11 which comprises a frame constructed of spaced side rails or channels 12 extending longitudinally of the truck and usually connected by end members not shown extending across and connecting the ends of the side rails. The usual wheels 13, shown only at the rear of the truck, support the frame thereof at an elevation above the ground.

The truck body 14 of this invention is open at its top and is of shell-like construction, being made of tough relatively lightweight sheet metal having resilient characteristics. The body here illustrated is characterized by a bottom wall having a forward horizontal portion 15 adapted to rest on a sub-frame 16 lying on top of the truck frame in the transit position of the body, and an upwardly and rearwardly slanting tail portion 17 which in effect provides the rear end wall of the body over which the body contents are adapted to flow in the elevated discharging position of the body.

To enable such discharge of the body contents, the body is mounted on a pedestal 18 extending upwardly from the sub-frame 16 beneath the rearmost part of the body and under its slanting tail portion 17 to swing about a fixed axis 19 defined by a suitable bearing structure carried jointly by the pedestal and the slanting bottom wall 17 of the body. A lift mechanism, in the form of one or more hydraulic lift units 20 carried by the pedestal and arranged to react against the slanting bottom wall 17 of the body, is provided to effect elevation of the forward end of the body to thereby enable the body contents to be discharged from the rear of the body.

The body of this invention is likewise provided with a longitudinal keel 21 formed by central portions 14' of the bottom walls 15 and 17 bent upwardly into the interior of the body and joined to a pipe 22 or other substantially rigid element common to both wall portions 14'. The keel 21 extends longitudinally of the body from a point adjacent to the pivot axis 19 forwardly to the front wall 23, and in the present case the keel also extends upwardly along the front wall to the open top or rim 24 of the body.

In addition to providing reinforcement for the body in its longitudinal dimension, it will be noted that the keel substantially divides the body into two longitudinally extending laterally adjacent body sections B1 and B2 lying at opposite sides of the keel and which sections are substantially resiliently slung from the ridge pipe 22 at the top of the keel by the bent-up wall portions 14' forming the sides of the keel. Thus while the keel renders the body substantially rigid in its longitudinal dimension, the narrow transverse width of the keel permits yielding flexure of the bottom walls of the body at either side of it with the result that the body sections B1 and B2 are capable of a slight amount of sag during the application of tilting force to the body at an area thereof beneath the keel.

The sagging action of the body sections thus renders the body flexible or yieldable in its transverse dimension and this yieldability is utilized to cushion the body during the application of lifting or tilting force thereto to thereby afford protection for the body shell against damage by shock.

Further protection for the body shell is afforded by the provision of a rigid but lightweight wishbone structure 25 interposed between the lift mechanism 20 and the slanting bottom wall 17 of the body to receive the thrust of the lift mechanism and distribute load reaction over a relatively large area of the slanting bottom wall 17.

The wishbone 25 includes a relatively narrow web 26 wide enough to merely span the crease in the underside of the body at the keel, preferably welded or otherwise permanently secured to the normally flat portions of the bottom wall 17 adjacent to its junction with the bent-up wall portions 14', and extending along the entire length of the slanting wall 17 from the rear extremity of the horizontal bottom wall 15 to the rear of the body at the upper edge of the slanting tail 17. Hence it will be apparent that the web 26 passes between the slanting bottom wall 17 and the bearing structure defining the pivot axis 19. As will be seen in Figure 3, the web is widened slightly at the rear of the body adjacent to the pivot axis 19 to a dimension at least equal to the width of the pedestal 18.

The underside of the web 26 has two pairs of spaced apart stringers 28 secured thereto with each pair extending lengthwise of the web a slight distance inwardly from the side edges of the web. The outermost stringers of each pair thereof cooperate with substantially triangle shaped plates 30 welded to the underside of the web along its side edges at the rear of the wishbone to provide a bearing structure for the body which cooperates with the bearing structure on the pedestal 18 to pivotally mount the body on the truck.

In the present embodiment illustrated, two hydraulic cylinders 20 have been shown for elevating the body to a load discharging position. These cylinders are located in side by side relationship and have their plungers 32 extending toward the wishbone to be received between the stringers 28 of each pair thereof and pivotally connected to said stringers as at 33, a distance forwardly of the pivot axis 19, so that projection of the plungers 32 out of the cylinders results in the application of a lifting force to the body through the wishbone structure. This lifting force is yieldingly carried into the body shell through the resilient portions of the slanting bottom wall 17.

While the wishbone structure serves to provide reinforcement for the slanting bottom wall of the body in addition to that afforded by the keel 21, its main function is to receive the thrust of the lift mechanism and to distribute load reaction over a relatively large area of the slanting bottom wall of the body without interfering to any appreciable degree with yielding flexure or sag of the body sections B1 and B2 during the application of lifting force to the body or while the body is held in an elevated position. The distribution of load reaction over a relatively great area of the slanting bottom wall of the body, which area, however, is restricted to a substantially narrow longitudinal zone beneath the keel, precludes the localization of load reaction on the body which might prove damaging to the relatively light material of which the body shell is constructed.

Additional rigidity for the wishbone is afforded by the provision of a box-like girder structure 35 fixed to the top side of the web 26 and projecting up inside the body crease at the keel. Inasmuch as practically as much load is exerted on the body portions adjacent to the pivot axis 19 as at the connections 33 between the lifting mechanism and the wishbone, strut members 36 and 37 are built into the wishbone structure, the uppermost strut member 36 forming a part of the box girder structure 35 and defining its end adjacent to the pivot axis 19 while the lowermost strut member 37 is secured to the bearing structure on the wishbone and leads forwardly therefrom to connect with the underside of the web 26 just above the connection 33 between the lift mechanism and the wishbone. A plate-like strut 37' extends from the rear of the lower strut member to the rear of the web 26, being fastened to both. The lower strut members 37 and 37' thus cooperate with the web to define a triangular truss (as viewed in longitudinal section, see Figure 2) which receives tension stresses imposed upon the wishbone at any time the hoisting mechanism is in operation, and cooperate with the upper box-like girder structure, which resists bending stresses on the web at such times, to render the entire wishbone rigid. Transverse ribs 38 running crosswise of the wishbone structure between the stringers thereof forwardly and rearwardly of the connection 33 between the lift mechanism and the wishbone further greatly stiffen the wishbone at the area at which lifting force is applied thereto.

Due to the unique construction of the body of this invention any sudden lifting forces, such as sometimes occur with hydraulic lift mechanisms and which normally produce extreme shocks having damaging effects upon dump truck bodies, are effectively dampened and absorbed or cushioned by the resiliency of the load carrying shell thus eliminating the danger of the relatively light metal from which the shell is made tearing under such conditions. Bodies made in accordance with this invention are particularly useful for conveying freshly mixed concrete from a mixing plant to a point of use. In this service, the bodies are subjected to extreme strain by frequent interruption of discharge followed by lowering of the body to a partially elevated position for travel of the truck to a new location at which concrete is needed. The resiliency of the body, however, very effectively cushions the body against any shocks to which it may be subjected to thereby preclude damage to the body shell.

From the foregoing description taken in connection with the accompanying drawings, it will be apparent that this invention provides a highly improved body for dump trucks wherein the body shell acts as a yielding load carrying element, its resilience effecting cushioning of and protection against any sudden forces which may be applied to the body in its elevated position or during elevation thereof.

What I claim as my invention is:

1. In a dump truck having a chassis: a shell-like body of resilient relatively light sheet metal, said body being open at its top and having an upwardly and rearwardly slanting bottom wall extending to its rear end, and having laterally outer sections at the junctions of said bottom wall with the body side walls which are curved on substantial radii and laterally inner sections at each side of the longitudinal center line of said bottom wall which curve upwardly therefrom on substantial radii to provide a central longitudinal keel for the body relative to which the laterally outer portions of said bottom wall are free to flex; a pivotal support on the chassis adjacent to the rear thereof; hoist mechanism on the chassis; and means for mounting the body on the chassis for tilting motion on said pivotal support and for connecting the body to the hoist mechanism, said means including a rigid lever-like support secured to said bottom wall of the body and mounted at its rear on said pivotal support and having said hoist mechanism connected to it intermediate its ends, engagement of that portion of the lever-like support from its outer end rearwardly to and including the area of its connection with the hoist mechanism being confined to longitudinal portions of said bottom wall adjacent to the junctions of said bottom with the curved inner sections at the base of the keel so that the portions of the body laterally outwardly of said longitudinal portions are free to flex.

2. In a tilt type dump truck having a chassis: a shell-like body on the chassis made of relatively light weight resilient sheet metal, said body being open at its top and having a slanting bottom wall extending upwardly toward the rear of the chassis and having its side walls joined to said bottom wall by curved sections having a radius equal to about one-quarter of the width of the body; a pivotal support on the chassis adjacent to the rear of the body; a rigid lever-like support for the body hinged at its rear end to the pivotal support on the chassis and extending forwardly from the pivot along the underside of said wall of the body for a distance at least equal to one-half the length of the body, and through which tilting force may be applied to the body; hoist mechanism on the chassis connected to the lever-like support intermediate the ends thereof for raising and lowering the support; means securing the body to the lever-like support, to tilt therewith, with the rear of the body adjacent to the pivotal support; said lever-like support flatwise engaging said bottom wall of the body inwardly of but adjacent to the inner ends of the curved sections at the junctions of the sides and said bottom wall through a zone extending from the forward end of the lever-like support rearwardly to the area of attachment of the hoist mechanism to the support, the portions of the body which are laterally outwardly of said zone being unsupported and free to flex during the application of tilting and load forces to the body.

3. A dump truck having a chassis, a shell-like body, means mounting the body on the chassis for tilting about an axis at the rear of the body, and lift mechanism on the chassis for tilting the body, characterized by the fact that the body is made of resilient relatively light sheet metal and has a slanting bottom wall extending upwardly to its rear end, which body has rounded corner sections of relatively wide radius curvature joining its bottom wall with its side walls and a longitudinal stiffening keel on said bottom wall of the body at the interior thereof comprising a pair of adjacent upwardly extending wall sections having their lower ends joined to the bottom wall by relatively large radius wall portions and joined to one another adjacent their upper edges; further characterized by a rigid, elongated, relatively narrow external reinforcement secured to the body and to which the mounting means and lift mechanism are connected and which transmits to the body the reactions of the lift mechanism; and further characterized by the fact that supporting engagement of said external reinforcement with said bottom wall of the body is confined to a narrow longitudinal central zone of said wall extending across the lower ends of said upwardly extending wall sections, the portions of said wall which extend laterally outwardly of said zone being otherwise unsupported and free to flex during the application of tilting or load forces to the body.

4. In a dump truck having a chassis: a body on the chassis made of resilient light weight sheet metal and having a slanting bottom wall extending upwardly to its rear and having rounded portions at the junctions of said bottom wall with the side walls curved on substantial radii; a pivotal support on the chassis, near the rear thereof, for mounting the body for tilting motion about an axis transverse to the truck chassis; tilt mechanism on the chassis for tiltably raising the body; a rigid elongated supporting member tiltably mounted on said pivotal support and to which the tilt mechanism is connected intermediate the ends of the member, said supporting member being secured to the underside of said wall of the body so that the body tilts with the supporting member with the pivot axis near the rear of the body, said supporting member supportingly engaging said wall of the body along a longitudinal central zone extending from the forward end of the supporting member rearwardly at least to and including the area of its connection to the hoist mechanism, said zone having a width no greater than half that of said bottom wall so that the laterally outermost portions of the bottom wall are free to flex to thereby cushion the impact of load and tilting force reactions upon the body.

5. The dump truck of claim 1 further characterized by the fact that the pivot axis is adjacent to the rear of the body, and further characterized by the fact that said lever-like support extends forwardly at least half the length of the body.

6. The dump truck of claim 1 further characterized by the fact that said lever-like support has pivot bearings at its rear, and further characterized by the fact that said support is widened at its rear and the pivot bearings are adjacent to its side edges so as to be axially spaced apart a substantial distance and thus afford a stable pivotal mounting for the body.

7. The dump truck of claim 1 further characterized by the fact that said rigid lever-like support includes a box girder truss extending upwardly between the upwardly curved laterally inner sections of the bottom wall to reinforce said lever-like support.

GLENWAY MAXON, Jr.

REFERENCES CITED

The following references are of record in the file of this patent:

UNITED STATES PATENTS

| Number | Name | Date |
|---|---|---|
| 372,470 | Hill | Nov. 1, 1887 |
| 1,133,941 | Dilliard | Mar. 30, 1915 |
| 1,704,917 | McCullough et al. | Mar. 12, 1929 |
| 1,883,936 | Kerr | Oct. 25, 1932 |
| 2,054,706 | Morley | Sept. 15, 1936 |
| 2,358,224 | Golay | Sept. 12, 1944 |
| 2,424,670 | Shimer | July 29, 1947 |
| 2,465,899 | Maxon | Mar. 29, 1949 |